US011010482B2

(12) United States Patent
Chen et al.

(10) Patent No.: US 11,010,482 B2
(45) Date of Patent: May 18, 2021

(54) SYSTEM AND METHOD FOR SECURE DEVICE CONNECTION (71) Applicant: Visa International Service Association, San Francisco, CA (US)

(72) Inventors: Yuexi Chen, Foster City, CA (US); Marc Kekicheff, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/045,740

(22) PCT Filed: Apr. 10, 2018

(86) PCT No.: PCT/US2018/026823
§ 371 (c)(1),
(2) Date: Oct. 6, 2020

(87) PCT Pub. No.: WO2019/199272
PCT Pub. Date: Oct. 17, 2019

(65) Prior Publication Data
US 2021/0034769 A1 Feb. 4, 2021

(51) Int. Cl.
*G06F 21/60* (2013.01)
*H04W 12/08* (2021.01)
(Continued)

(52) U.S. Cl.
CPC ............. *G06F 21/606* (2013.01); *H04L 9/00* (2013.01); *H04L 9/08* (2013.01); *H04W 12/08* (2013.01)

(58) Field of Classification Search
CPC ........ G06F 21/606; H04W 12/08; H04L 9/00; H04L 9/08
See application file for complete search history.

(56) References Cited

U.S. PATENT DOCUMENTS 5,706,349 A * 1/1998 Aditham ................. G06F 21/33
713/159
7,409,552 B2 8/2008 Buttyan et al.
(Continued)

FOREIGN PATENT DOCUMENTS

WO 2007134112 11/2007

OTHER PUBLICATIONS

H. Harb, H. Farahat and M. Ezz, "SecureSMSPay: Secure SMS Mobile Payment model," 2008 2nd International Conference on Anti-counterfeiting, Security and Identification, Guiyang, 2008, pp. 11-17, doi: 10.1109/IWASID.2008.4688346. (Year: 2008).*
(Continued)

*Primary Examiner* — Shanto Abedin
*Assistant Examiner* — Sameera Wickramasuriya
(74) *Attorney, Agent, or Firm* — Kilpatrick Townsend & Stockton LLP (57) ABSTRACT

A method includes generating, by a portable communication device, a first random code and transmitting the first random code to an access device. The access device receives the first random code, generates a second random code, receives a personal token from a user of the portable communication device, and hashes the first random code, the second random code, and the personal token to form a first hash output. The first hash output and the second random code are received from the access device. The first random code, a stored personal token, and the second random code are hashed to form a second hash output. A determination is made if the first hash output and the second hash output are equal. A secure communication channel is formed between the portable communication device and the access device when the first hash output and the second hash output are equal.

20 Claims, 5 Drawing Sheets (51) Int. Cl.
  *H04L 9/00* (2006.01)
  *H04L 9/08* (2006.01)

(56) References Cited

U.S. PATENT DOCUMENTS

| | | | | |
|---|---|---|---|---|
| 9,244,864 | B2* | 1/2016 | Suzuki | G06F 21/00 |
| 10,728,229 | B2* | 7/2020 | Wang | G06F 21/629 |
| 2005/0185794 | A1 | 8/2005 | Billhartz et al. | |
| 2006/0072745 | A1* | 4/2006 | Fukaya | G06F 21/606 |
| | | | | 380/28 |
| 2006/0116107 | A1 | 6/2006 | Hulvey | |
| 2006/0280297 | A1* | 12/2006 | Fukaya | H04L 9/0844 |
| | | | | 380/28 |
| 2007/0245154 | A1* | 10/2007 | Akkermans | G06K 9/00885 |
| | | | | 713/186 |
| 2008/0016368 | A1 | 1/2008 | Adams | |
| 2008/0114983 | A1* | 5/2008 | Sherkin | H04L 63/083 |
| | | | | 713/171 |
| 2010/0017603 | A1* | 1/2010 | Jones | H04L 9/3297 |
| | | | | 713/168 |
| 2013/0016833 | A1* | 1/2013 | Brown | H04L 63/062 |
| | | | | 380/44 |
| 2013/0129093 | A1* | 5/2013 | Patel | H04W 12/04031 |
| | | | | 380/270 |
| 2013/0333009 | A1* | 12/2013 | Mackler | H04L 9/3297 |
| | | | | 726/7 |
| 2016/0173461 | A1* | 6/2016 | Schechter | H04L 63/06 |
| | | | | 713/168 |
| 2018/0131529 | A1* | 5/2018 | Cambou | H04L 9/0662 |

OTHER PUBLICATIONS

F. Aloul, S. Zahidi and W. El-Hajj, "Two factor authentication using mobile phones," 2009 IEEE/ACS International Conference on Computer Systems and Applications, Rabat, 2009, pp. 641-644, doi: 10.1109/AICCSA.2009.5069395. (Year: 2009).*

Application No. PCT/US2018/026823 , International Search Report and Written Opinion, dated Jan. 9, 2019, 12 pages.

EP18914663.2 , "Extended European Search Report", dated Mar. 17, 2021, 7 pages.

Fomichev et al., "Survey and Systematization of Secure Device Pairing", IEEE Communications Surveys & Tutorials, vol. 20, No. 1, Sep. 8, 2017, pp. 517-550.

Mirzadeh et al., "Secure Device Pairing: A Survey", IEEE Communications Surveys & Tutorials, vol. 16, No. 1, Jan. 1, 2014, pp. 17-40.

* cited by examiner

SYSTEM AND METHOD FOR SECURE DEVICE CONNECTION

CROSS-REFERENCES TO RELATED APPLICATIONS

This application is a 371 National Stage of International Application No. PCT/US2018/026823 International Filing Date Apr. 10, 2018, which is herein incorporated by reference.

BACKGROUND

Figure 1:
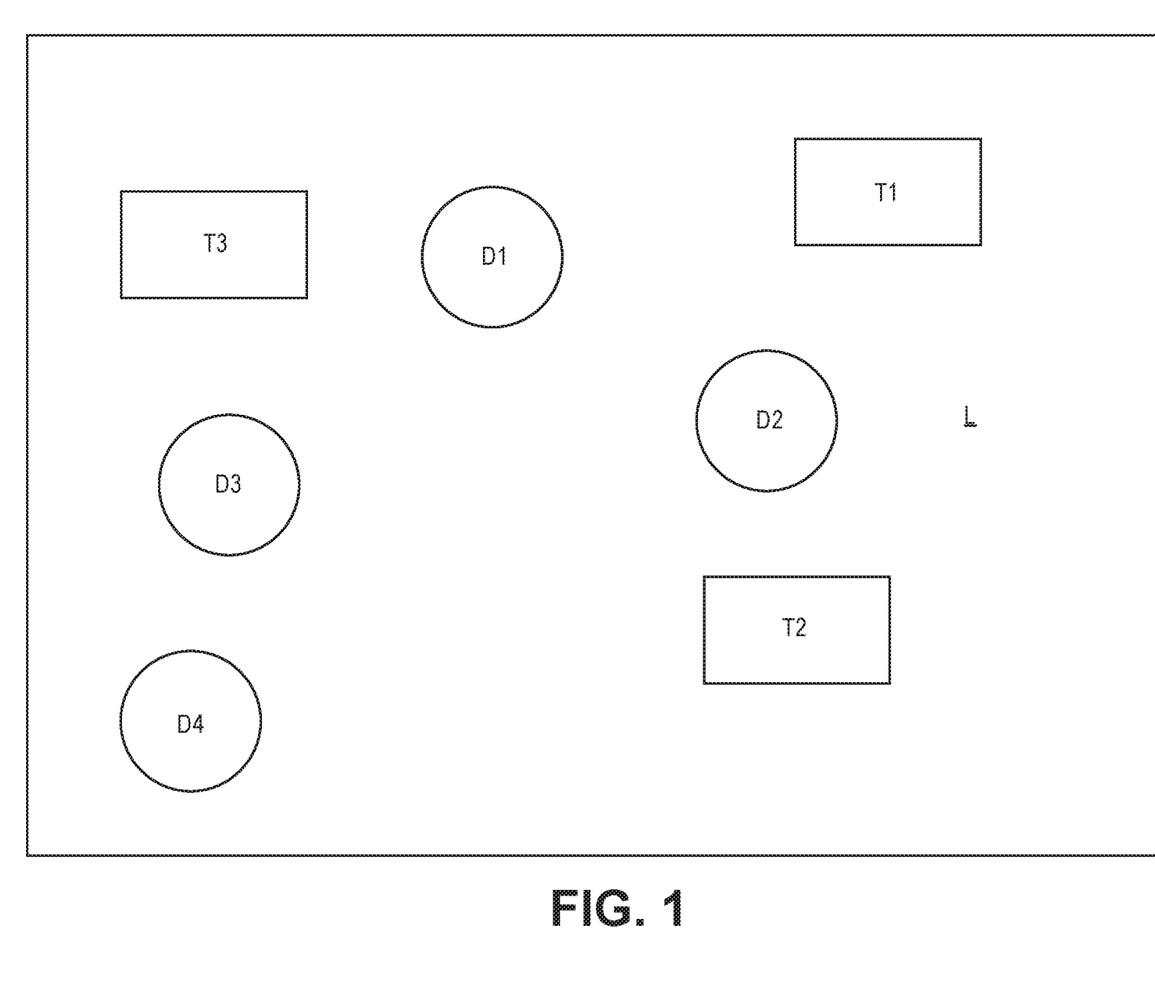
FIG. 1 shows a diagram illustrating a number of portable communication devices and a number of access devices within a specified location.

There are many instances where multiple portable communication devices can be capable of communicating with multiple terminals in a specific location to obtain access to specific resources. For example, referring to FIG. 1, there can be multiple portable communication devices D1, D2, D2, and D4, which can be capable of interacting with multiple access devices T1, T2, and T3 in a location L. Each of the access devices T1, T2, and T3 may be point of sale terminals, kiosks, secure location entry devices, etc., The portable communication devices D1, D2, D3, and D4 can be mobile phones, wearable devices, etc. that are capable of interacting (e.g., conducting a payment transaction) with the access devices T1, T2, and T3. The portable communication devices D1, D2, D3, and D4 can communicate with any of the access devices T1, T2, and T3 using a medium range communication protocol such as Bluetooth®. However, to ensure that the user of a particular portable communication device is correctly interacting with an intended access device, pairing is required to securely connect the particular portable communication device and the intended access device.

There are a number of ways to pair a portable communication device with an access device to perform an interaction. They include the following examples.

In a first example, access devices can broadcast their identifiers over the air to the different portable communication devices within the location. A portable communication device within the vicinities of the access devices can scan and find the nearby multiple access devices. The portable communication device asks the user to select one access device to connect to, to conduct the next transaction. A problem associated with this method is that the user needs to open the portable communication device (e.g., take out the portable communication device and unlock it), and choose an access device from a list of candidate access devices. The candidate access devices can be associated with candidate access device identifiers (e.g. checkout lane number, gas pump number, etc.). This is time consuming and is not a hands-free user experience. It also requires a human readable access device identifier.

In another example, portable communication devices can broadcast their identifiers (e.g. a device name set by user, such as "Joe's iPhone"). An access device within the vicinities of the portable communication devices can scan and can find nearby portable communication devices. The access device asks the user to select one portable communication device to connect to, so that it can perform an interaction with the access device. A problem with this process is that the portable communication device broadcasts a static identifier. This raises privacy issues, as it can be used to track the user. The portable communication device cannot use a random identifier, because the user will not be able to recognize it or pick his/her portable communication device from the list of nearby portable communication devices.

In yet another example, an access device can display a OR code, which can include an identifier for the access device. The portable communication device scans the QR code, and connects to the corresponding access device. One problem with this process is that the user needs to open the portable communication device (e.g., take out the portable communication device and unlock it), and then cause the portable communication device to perform a scan. This is not a hands-free user experience and is inconvenient. It also requires a user to physically stand next to the access device.

In yet another example, a portable communication device displays a OR code, which encodes an identifier for the portable communication device. The access device scans the OR code. It then connects to the corresponding portable communication device. This process also raises privacy issues, since the user's location can be tracked.

In still other examples, a barcode, NFC tag, sound, or ultrasonic signal could be used instead of a QR code, but the same problems would still exist.

Thus, what is needed is a more convenient and secure way to allow for the interaction between an access device and a portable communication device. It would also be desirable to maintain user privacy.

Embodiments of the invention address this and other problems, individually and collectively.

BRIEF SUMMARY

Embodiments of the invention include secure and convenient ways to connect portable communication devices with access devices in a wireless environment.

One embodiment of the invention includes a method generating, by a portable communication device comprising a data processor and a memory storing a personal token, a first random code, the portable communication device being used by a user; transmitting, by the portable communication device, the first random code to an access device, wherein the access device receives the first random code, generates a second random code, receives the personal token from a user of the portable communication device, and hashes the first random code, the second random code, and the personal token to form a first hash output; receiving, from the access device, the first hash output and the second random code; hashing the first random code, the stored personal token; and the second random code to form a second hash output; determining, by the portable communication device, if the first hash output and the second hash output are equal; and forming a secure communication channel between the portable communication device and the access device when the first hash output and the second hash output are equal. If the first hash output and the second hash output are not equal, then the personal token entered into the access device and the personal token stored in the portable communication device did not match. In this case, the connection process will then stop and a secure communication channel would not be formed.

Another embodiment of the invention includes a portable communication device comprising: a processor; and a computer readable medium coupled to the processor, comprising code executable by the processor for implementing a method comprising: generating, by a portable communication device comprising a data processor and a memory storing a personal token, a first random code, the portable communication device being used by a user, transmitting, by the portable communication device, the first random code to an access device, wherein the access device receives the first random code, generates a second random code, receives the personal token from a user of the portable communication device, and hashes the first random code, the second random code, and the personal token to form a first hash output, receiving, from the access device, the first hash output and the second random code, hashing the first random code, the stored personal token, and the second random code to form a second hash output, determining, by the portable communication device, if the first hash output and the second hash output are equal, and forming a secure communication channel between the portable communication device and the access device when the first hash output and the second hash output are equal.

Another embodiment of the invention is directed to a method comprising: receiving, by the access device, a first random code from a portable communication device; generating, by the access device, a second random code; generating, by the access device, a first hash output of the first random code, the second random code, the personal token; transmitting, by the access device, the second random code and the first hash output to a portable communication device within a vicinity of the access device, wherein the portable communication device generates a second hash output from the personal token, the first random value, and the second random value, and determines if the first hash output and the second hash output are equal; and forming a secure communication channel between the access device and the portable communication device when the first hash output and the second hash output match.

Another embodiment of the invention is directed to an access device comprising: a data processor; and a computer readable medium, the computer readable medium comprising code, executable by the processor, for performing a method such as the method noted above.

In some embodiments, the access device can receive multiple first random codes from multiple portable communication devices in the vicinity of the access device. The access device can generate a first hash output for each of the multiple communication devices, and transmit the same to them for evaluation.

In some embodiments, a portable communication device can receive multiple first hash outputs from multiple access devices in the vicinity of the portable communication device. The portable communication device can calculate multiple second hash outputs until one matches a received first hash output. If a match is present, then a secure communication channel between the portable communication device and the access device providing the matching first hash output. If there are no second hash outputs that match the received first hash outputs, then the connection process may stop.

These and other embodiments of the invention are described in further detail below.

DETAILED DESCRIPTION

Portable communication devices (e.g. mobile phones, wearable devices, IoT devices) can communicate using medium range communication protocols such as Bluetooth® and WiFi™. New access devices (e.g., smart POS devices, mobile POS devices) can also communicate using medium range communication protocols. Portable communication devices can interact with access devices using such medium range communication protocols.

Medium range communication protocols have following advantages. First, a user can use a portable communication device to perform a transaction with an access device, hands-free without swiping, dipping or tapping the portable communication device against the access device. Further, although QR codes have been used, they are difficult to implement in two way communications between an access device and a portable communication device. Second, a user with a portable communication device can also perform a transaction without being physically next to the access device, which reduces wait times to conduct the transaction (e.g., waiting in a checkout lane). Third, a resource provider such as a merchant can process interactions faster when there is no checkout lane. Fourth, an employee of the resource provider can interact with a user during a transaction, regardless of the user's or the employee's location within a store.

Before discussing specific embodiments and examples, some descriptions of terms used herein are provided below.

A "portable communication device" may be a portable device that can be transported and be operated by a user; and may include one or more electronic components (e.g., an integrated chip, etc.). A portable communication device according to an embodiment of the invention may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A portable communication device may also be in the form of a vehicle (e.g., a car) equipped with communication capabilities.

Portable communication devices according to embodiments of the invention can be configured to communicate with external entities such as remote communication gateways through long range communications technologies and protocols. They may also be configured to communicate with external entities such as access devices using any suitable short or medium range communications technology including Bluetooth® (classic and BLE—Bluetooth® low energy), WiFi™, etc.

A "portable transaction device" may be a portable communication device that can be used to conduct a transaction. A portable transaction device may include a storage technology (e.g., electronic memory, magnetic stripe, etc.) to store credentials or tokens associated with an account of a user. A portable transaction device can be in any of the forms described above with respect to the portable communication device, or in the form of a card (e.g., integrated chip card, magnetic stripe card) or a fob, etc. In some embodiments, the portable transaction device and the portable communication device may be the same device, and need not be separate devices. Specific examples of portable transaction devices can include mobile phones such as smart phones, wearable devices, payment cards such as credit, debit, and prepaid cards, vehicles with remote communication capabilities, etc.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to an entity to perform an authorization process. In some cases, the authorization request message may be sent to a processor server computer associated with a processing network and/or an authorization computer associated with an authorizing entity to request authorization for an access request. An authorization request message according to some embodiments may comply with (International Organization of Standardization) ISO 8583, which is a standard for systems that exchange electronic transaction information associated with a payment made by a user using a payment device or payment account. The authorization request message may include an account identifier that may be associated with a device or account. An authorization request message may also comprise additional data elements corresponding to "identification information" including, by way of example only: a service code, a CVV (card verification value), a dCVV (dynamic card verification value), an expiration date, etc. An authorization request message may also comprise "access request information," such as any information associated with a current access request, such as the access request amount, resource provider identifier, resource provider location, etc., as well as any other information that may be utilized in determining whether to identify and/or authorize an access request.

An "authorization response message" may be an electronic message reply to an authorization request message utilized for an authorization process. In some embodiments, the authorization response message may be generated by a processor server computer associated with a processing network and/or an authorization computer associated with an authorizing entity. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the processing network) to the resource provider's access device (e.g. POS equipment) that indicates approval of the transaction. The code may serve as proof of authorization. As noted above, in some embodiments, a processing network may generate or forward the authorization response message to the resource provider.

A "token" may include a substitute identifier for some information. For instance, a token may include a series of alphanumeric characters that may be used as a substitute for an original account identifier. In some cases, the token may be a payment token, which may include an identifier for a payment account that is a substitute for a real account identifier, such as a primary account number (PAN). For example, a token "4900 0000 0000 0001" may be used in place of a PAN "4147 0900 0000 1234." In some embodiments, a token may be "format preserving" and may have a numeric format that conforms to the account identifiers used in existing processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived.

"Access data" may include account information, or any other suitable type of data that can be used to access a resource such as data, goods, services, locations, etc. Access data may be specifically associated with a user or a set of users, and may be in any suitable form. Access data may include account information, access tokens, etc.

"Account information" may refer to any information associated with a user's account. Such information may be directly related to the account or may be derived from information related to the account. Examples of account information may include an account identifier, a username, a password, user information (e.g., name, age, email address, shipping address, etc.). In some cases, account information may also be known as payment account information, card account information, or the like, and may be associated with a payment device (e.g., payment card). For example, account information may include a PAN (Primary Account Number or "account number"), user name, expiration date, CVV (Card Verification Value), dCVV (Dynamic Card Verification Value), CVV2 (Card Verification Value 2), CVC3 card verification values, etc. CVV2 is generally understood to be a static verification value associated with a payment device. CVV2 values are generally visible to a user (e.g., a user), whereas CVV and dCVV values are typically embedded in memory or authorization request messages and are not readily known to the user (although they are known to the issuer and payment processors).

A "resource providing entity" may be an entity that may make resources available to a user. Resource providing entities may also be known as resource providers. Examples of resource providing entities include resource providers, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make physical items (e.g., goods, products, etc.) available to the user. In other embodiments, resource providing entities may make digital resources (e.g., electronic documents, electronic files, etc.) available to the user. In other embodiments, resource providing entities may manage access to certain resources by the user. In some embodiments, the resources may be services (e.g., digital wallet services).

An "access request" may refer to a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requester may transmit the access request message to a device associated with a resource provider.

"Access request data" may refer to any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

Figure 2:
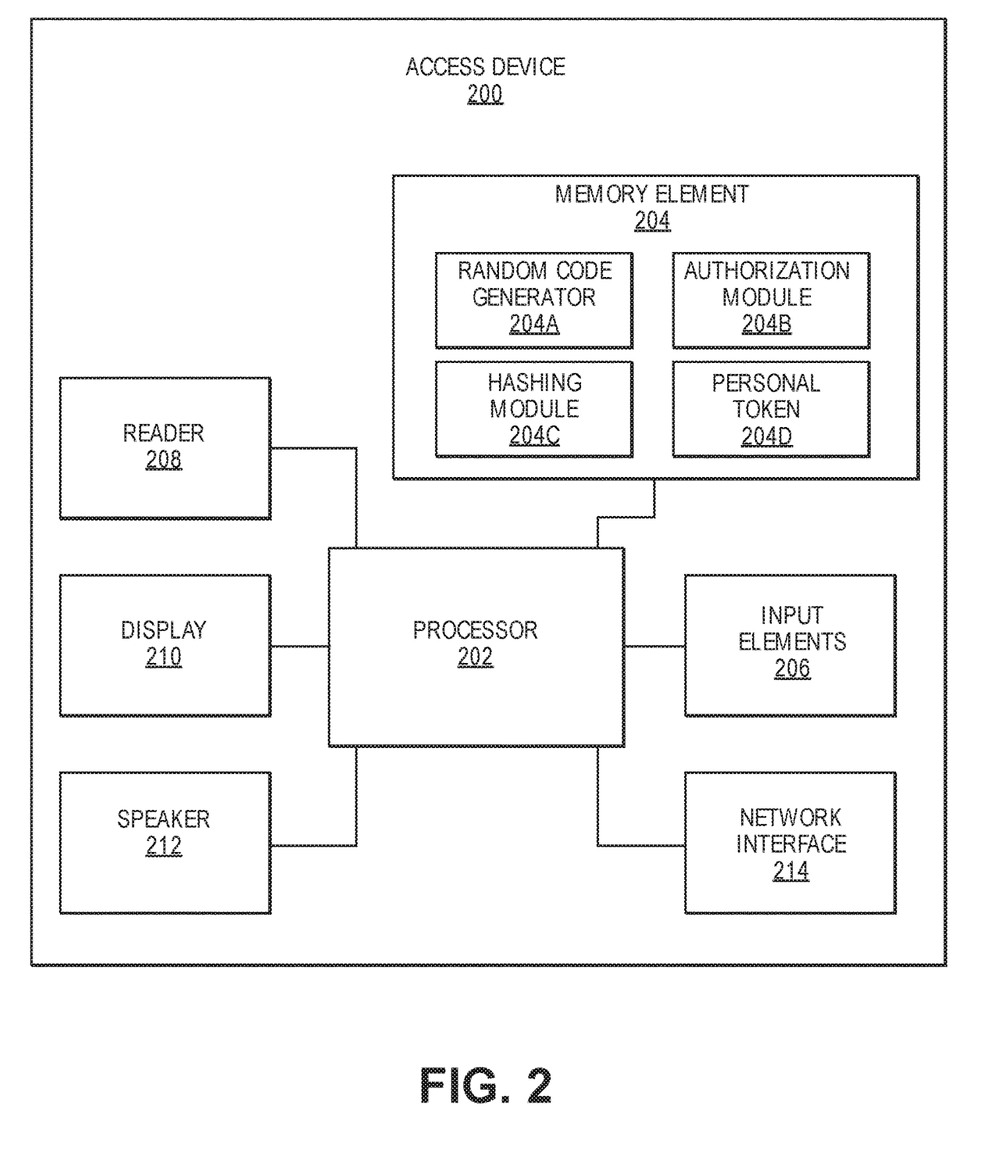
FIG. 2 shows a block diagram of an access device according to an embodiment of the invention.

FIG. 2 shows a block diagram of an access device 200 according to an embodiment of the invention. The access device 200 may comprise a processor 202, and a memory element 204 comprising a computer readable medium 304 coupled to the processor 202. A device reader 208, a display 210, a speaker 212, input elements 206, and a network interface 214 may be electronically coupled to the processor 202. Exemplary device readers can include RF (radio frequency) antennas, magnetic stripe readers, etc. that can interact with a portable communication device. Exemplary computer readable media may include one or more memory chips, disk drives, etc.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

The network interface 214 may be any suitable combination of hardware and software that enables data to be transferred to and from external computers. Network interface 214 may enable processor server computer 214 to communicate data to and from another device (e.g., resource provider computer, authorization computer, etc.). Some examples of network interface 214 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 220 may include Wi-Fi™.

Data transferred via network interface 214 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 214 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The memory element 204 may comprise a computer readable medium that may store code or instructions for causing the access device 200 to perform the functions described herein. For example, the memory element 204 may comprise a random code generator 204A, an authorization module 204B, a hashing module 204C, and a personal token 204D.

The random code generator 204A may comprise code or instructions, and/or hardware for causing the access device 200 to generate random codes such as random numbers. The random code generator may be a random number generator. Exemplary random number generators may include pseudo-random number generators (PRNGs), true random number generators (TRNGs), and quasi-random number generators.

The authorization module 204B may comprise code or instructions for causing the access device 200 to generate and format an authorization request message, send the authorization request message to an issuer for approval, and receive an authorization response message.

The hashing module 204C may comprise code, executable by the processor 202 to create a hash of one or more data inputs. The hashing module 204C may include hash function such as SHA-1, SHA-2, SHA-256, etc.

The personal token 204D may be a piece of data that is created and entered by the user of a portable communication device into a temporary memory in the access device 200. The temporary memory may have code or logic for causing the memory element 204 to delete the personal token and any other received personal tokens after a predetermined amount of time (e.g., every hour, every two hours, every day, etc.). Examples of personal tokens may include passwords, personal identification numbers (PINs), biometric samples and templates, etc.

In some embodiments, the computer readable medium in the memory element 204 may comprise, code, executable by a processor in the access device to perform a method. The method may comprise receiving, by an access device, a personal token from a user; receiving, by the access device, a first random code from a portable communication device; generating, by the access device, a second random code; generating, by the access device, a first hash output of the first random code, the second random code, the personal token; transmitting, by the access device, the second random code and the first hash output to a portable communication device within a vicinity of the access device, wherein the portable communication device generates a second hash output from the personal token, the first random code, and the second random code, and determines if the first hash output and the second hash output are equal; and forming a secure communication channel between the access device and the portable communication device when the first hash output and the second hash output are the same.

Figure 3:
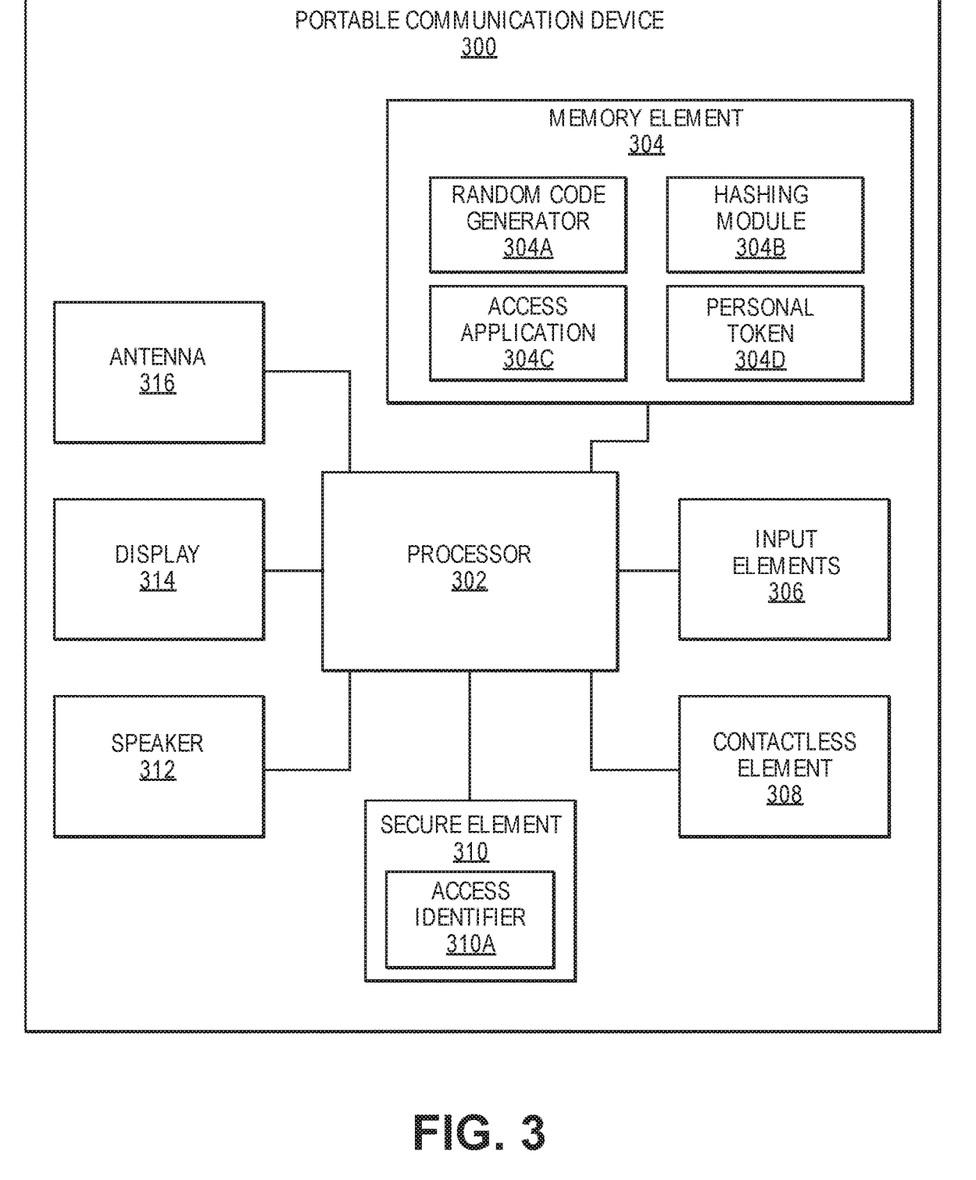
FIG. 3 shows a block diagram of an exemplary portable communication device according to an embodiment of the invention.

FIG. 3 shows a block diagram of an exemplary portable communication device according to an embodiment of the invention.

Portable communication device 300 may include a processor 302 (e.g., a microprocessor) for processing functions of the portable communication device 300. One exemplary function enabled by processor 302 includes processing functions of display 314 to allow a user to see information (e.g., interfaces, contact information, messages, etc.).

Portable communication device 300 may comprise a secure element 310. Secure element 310 may be a secure memory on the portable communication device 300 such that the data contained on secure element 310 cannot easily be hacked, cracked, or obtained by an unauthorized entity. Secure element 310 may be utilized by portable communication device 300 to host and store data and applications that may require a high degree of security. Secure element 310 may be either embedded in the handset of portable communication device 300 or in a subscriber identity module (SIM) card that may be removable from the portable communication device 300. Secure element 310 can also be included in an add-on device such as a micro-Secure Digital (micro-SD) card or other portable storage device.

Secure element 310 may store any suitable sensitive information. For example, secure element 310 may store access data (e.g., account information, token information, etc.) associated with a user. For example, the secure element 310 may store an access identifier 310A such as an access code, account number, payment token, etc. Other information that may be stored in secure element 310 may include user information or user data (e.g., name, date of birth, contact information, etc.).

Portable communication device 300 may comprise a memory element 304 comprising a computer readable medium. The computer readable medium coupled to the processor 302, and may comprise code executable by the processor 302 for implementing a method. The method may comprises generating, by the portable communication device comprising a data processor and a memory storing a personal token, a first random code, the portable communication device being used by a user; transmitting, by the portable communication device, the first random code to an access device, wherein the access device receives the first random code, generates a second random code, receives the personal token from a user of the portable communication device, and hashes the first random code, the second random code, and the personal token to form a first hash output; receiving, from the access device, the first hash output and the second random code; hashing the first random code, the stored personal token, and the second random code to form a second hash output; determining, by the portable communication device, if the first hash output and the second hash output are equal; and forming a secure communication channel between the portable communication device and the access device when the first hash output and the second hash output are equal.

The memory element 304 may be present within a body of portable communication device 300 or may be detachable from the body of portable communication device 300. The body of portable communication device 300 may be in the form of a plastic substrate, housing, or other structure. Memory element 304 may store data (e.g., applications, etc.) and may be in any suitable form (e.g., a magnetic stripe, a memory chip, etc.).

Memory element 304 may comprise a random code generator 304A, a hashing module 304B, an access application 304C such as a mobile payment application, and a personal token 304D. The personal token 304D may be the same as the personal token 204D entered into the access device 200 in FIG. 2. The hashing module 304B and the personal token 3040 may be similar to the hashing module 204C and the personal token 2040 in FIG. 2, and the descriptions thereof need not be repeated here.

Access application 3020 may be computer code or data stored on a computer readable medium (e.g. memory element 304) that may be executable by processor 302 to complete a task (e.g., provide a service). Access application 302C may be an application that operates on portable communication device 300 and that may provide a user interface for user interaction (e.g., to enter and view information). Examples of access applications can include payment applications, digital wallet applications, transit applications, secure location access applications (e.g., hotel room applications), etc.

Portable communication device 302 may further include a contactless element 308, which may typically be implemented in the form of a semiconductor chip (or other electronic data storage element) with an associated wireless transfer (e.g., data transmission) element, such as a short range antenna. Contactless element 308 may be associated with (e.g., embedded within) the portable communication device 300. Data or control instructions transmitted to another entity (e.g., a device) may be applied to contactless element 308 by means of a contactless element interface (not shown).

Contactless element 308 may be capable of transferring and receiving data. Portable communication device 300 may support contactless transactions using the EMV contactless communication protocol (EMV-CCP), which is based on ISO 14443, in order to interact with access devices (e.g., reader devices). This capability may be met by using Bluetooth®, BLE (Bluetooth Low Energy), or other data transfer capability that can be used to exchange data between the portable communication device 300 and an interrogation device in an access device.

Portable communication device 302 may further include an antenna 316 for wireless data transfer (e.g., data transmission). Antenna 316 may be utilized by portable communication device 300 to send and receive wireless communications over a long range communications network. Antenna 316 may assist in connectivity to the Internet or other communications networks and enable data transfer functions. Antenna 316 may enable SMS, USSD, as well as other types of cellular communications, such as voice call and data communications.

Portable communication device 300 may include a display 314 that may show information to a user. Display 314 may be any suitable screen and may enable touch functionality. In some embodiments, display 314 of portable communication device 300 may display a user interface (e.g., of a mobile application or website) that may allow the user to select and interact with objects presented on display 314. The objects may include, but may not be limited to, menus, text fields, icons, and keys/inputs on a virtual keyboard.

Portable communication device 300 may include a speaker 312, which may be any suitable device that can produce sound in response to an electrical audio signal.

Speaker 312 may play recorded sounds, as well as prerecorded messages to communicate with a user. In some cases, the user may be able to receive instructions by voice communications played by speaker 312 to which the user may respond (e.g., by returning voice command, activating input elements, etc.).

Portable communication device 300 may further include input elements 306 to allow a user to input information into the device. Example input elements 306 include hardware and software buttons, audio detection devices (e.g., microphone), biometric readers, touch screens, and the like. A user may activate one or more of input elements 306, which may pass user information to the portable communication device 300. In some cases, one or more of input elements 306 may be utilized to navigate through various screens of the access application 3040.

In some embodiments, where portable communication device 300 is a phone or other similar computing device, portable communication device 300 may include a browser stored in the memory element 304 and may be configured to retrieve, present, and send data across a communications network (e.g., the Internet). In such embodiments, portable communication device 300 may be configured to send data as part of an access request. In some embodiments, portable communication device 300 may provide the data upon request from another entity (e.g., access device).

Figure 4:
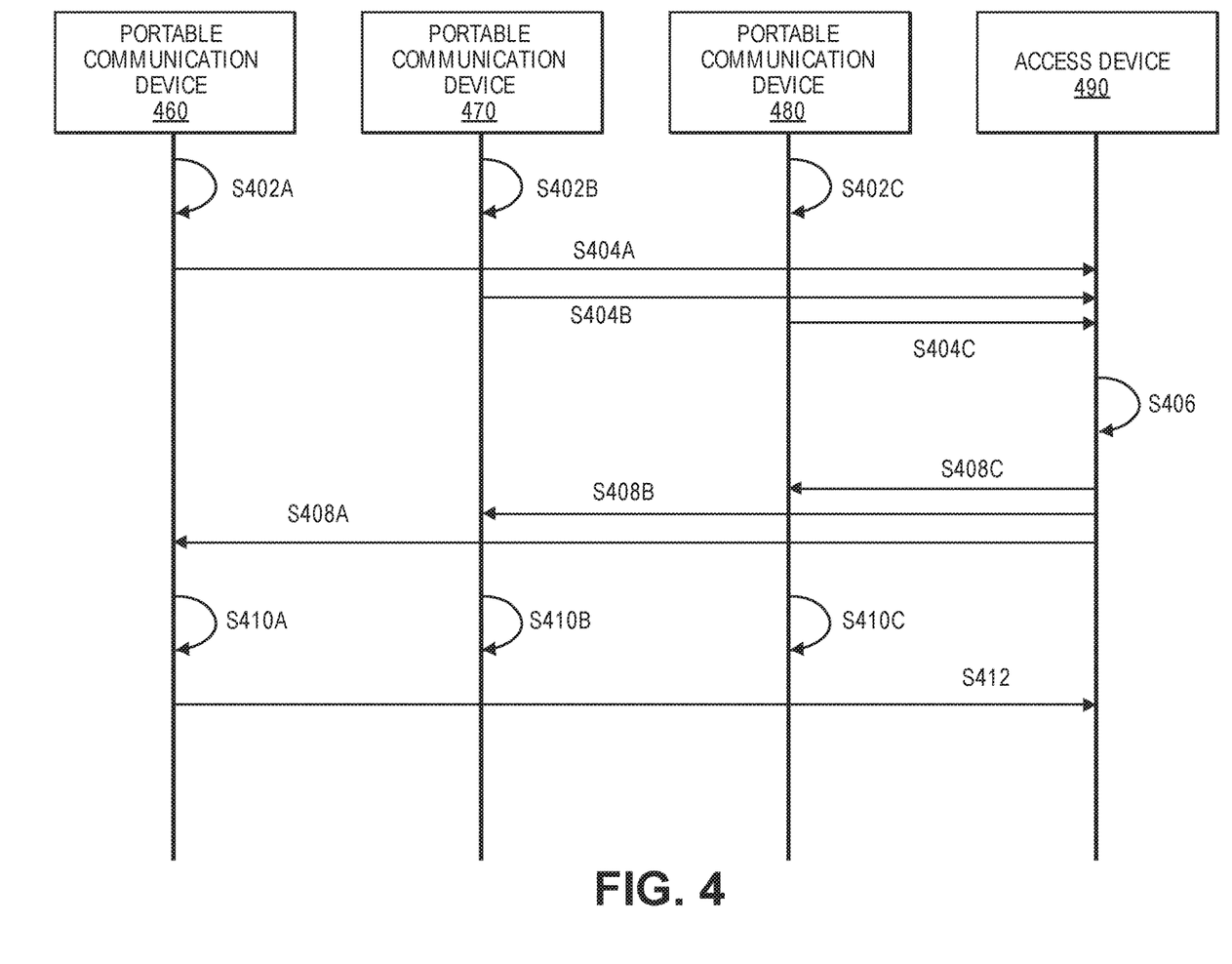
FIG. 4 shows an exemplary flow diagram illustrating methods according to embodiments of the invention.

FIG. 4 shows an exemplary flow diagram illustrating methods according to embodiments of the invention. FIG. 4 shows a number of portable communication devices 460, 470, 480 in the same general vicinity as access device 490. The portable communication devices 460, 470, 480 can communicate with the access device 490 via a short range communication protocol such as Bluetooth®, Bluetooth® Low Energy (BLE), WiFi™, etc.

A method may be described with respect to a user operating portable communication device 460 wishing to interact with the access device 470. The users of the other portable communication devices 470, 480 have not yet expressed an intent to interact with access device 470. Access device 490 is capable of communicating with each of the portable communication devices 460, 470, 480, so the access device 490 needs to specifically pair with and form a secure communication channel with portable communication device 460.

Prior to entering the location or otherwise interacting with the access device 490, a user enters a personal token into portable communication device 460 and it can be stored in the portable communication device 460. This personal token can be any suitable information that is chosen by the user. For example, the personal token can be a 2-4 digit number (e.g. birth month and date, last 4 digits of phone number, etc.), a pattern (e.g. like an Android™ unlock pattern), an emoji/icon, a biometric, etc. For purposes of illustration, the personal token associated with portable communication device 460 can be the last four digits of the user's phone number, such as "5549."

At some point in time, the user can carry the portable communication device 460 to the location. It may be present in the user's pocket, bag (e.g., purse), etc. If it is a smart wearable device, it may be worn by the user. For example, the user may enter a store and may express an intent to pay for a purchase of an item by interacting with the access device 490, which may be a POS (point of sale) terminal.

In steps S402A, S402B, S402C, each portable communication device 460, 470, 480 can store a unique personal token, and can generate a first random code using a random code generator module. This random code (e.g., a random number) can be temporarily stored in a memory device in the portable communication device 460. For example, the portable communication device 460 can generate a first random number, RN1, and broadcasts RN1 in step S404A. RN1 gets refreshed at periodic intervals (e.g. 60 seconds) to improve security, thereby preventing replay attacks. For example, a new random number may be generated every 5, 10, or 60 minutes, or more. Portable communication device 470 can similarly generate and broadcast a second random number, RN2, in step S404B. Portable communication device 480 can similarly generate and broadcast a third random number, RN3, in step S404O. The access device 480 can scan for proximate portable communication devices, and can receive the first, second, and third random numbers RN1, RN2, and RN3. The access device 480 may also receive device identifiers or addresses for each of the portable communication devices 460, 470, 480.

In step S406, the access device 490 receives the first number RN1 from the portable communication device 460, and generates a fourth random number RN4 using its random number generation module. The user of the portable communication device 460, can then interact with the access device 490 by entering the personal token (e.g., "5549") into the access device 490. The access device 490 then hashes the first random number RN1, the fourth random number RN4, and the personal token "5549" using its hashing module to form a first hash output, H1 (H1=F(RN1, 5549, RN4), where F ( ) is a hash function) for portable communication device 460. The access device 490 also generates another hash output, H2, for the portable communication device 470, by hashing the second random number, the fourth random number, the personal token (H2=(RN2, 5549, RN4)). The access device also generates another hash output, H3, for the portable communication device 480, by hashing the third random number, the fourth random number, the personal token (H3=(RN3, 5549, RN4)).

For purposes of illustration, the personal tokens associated with and stored in portable communication device 470 and portable communication device 480 may be 9444 and 0000, respectively. These numbers were not entered into the access device 490, since the users of the portable communication devices 470, 480 did not express an intent to interact with the access device 490.

In some embodiments, the inputs to the hash function may be concatated prior to hashing, or filler values may be included with or between the inputs prior to hashing. For example, input values such as RN1, RN4, and "5549" may be concatenated together and then hashed to form the first hash output, H1.

In step 408A, the access device 490 transmits the first hash output, H1, and the fourth random number, RN4, to the portable communication device 460. In steps S408B and 54080, the access device 490 also transmits the hash outputs, H2 and H3, and the fourth random number, RN4, to the portable communication devices 470, 480, respectively.

In step 410A, the portable communication device 460 hashes the previously generated first random number, RN1, the stored personal token, "5549," and the fourth random number, RN4, received from the access device 490 to form a second hash output, H4 (i.e., H4=F(RN1, 5549, RN4), where F( ) is a hash function). The portable communication device 460 then determines if the first hash output, H1, received from the access device 490 and the second hash output, H4, are equal.

If the first hash output, H1, and the second hash output, H4, are equal, then in step S412, a secure communication channel is formed between the portable communication device 460 and the access device 490. The secure communication channel can be used formed in any suitable manner. Session keys and other known security protocols, such Diffie-Hellman protocols, may be established between the communication device 460 and the access device 490, such that data between these two devices are encrypted and secure. Such secure communication channels are used in Bluetooth® and BLE type wireless connections. If the first hash output H1 and the second hash output H4 are not equal, then no secure communication is established, since the stored personal identifier and the personal identifier received at the access device 490 did not match.

Note that portable communication device 470 will calculate a different hash output (e.g., H5=F(RN2, 9444, RN4) than the hash output, H2 (which is F(RN2, 5549, RN4), received from the access device 490, so the access device 490 will not form a secure communication channel to the portable communication device 470. Similarly, the portable communication device 480 will calculate a different hash output (e.g., H6=F(RN3, 0000, RN4) than the hash output, H3 (which is F(RN3, 5549, RN4), received from the access device 490, so the access device 490 will not form a secure communication channel to the portable communication device 480.

Embodiments of the invention have a number advantages. For example, the user's personal token is not transferred between the portable communication device and the access device to which it will connect. Consequently, the security of the personal token remains intact. Further, the random codes that are used are dynamic, and protect user privacy as no device identifier needs to be broadcasted between the portable communication device and the access device to which it will connect. Still further, the portable communication device decides whether to connect to an access device by examining a hashed result, thereby providing greater security. Also, no user interaction is required so the pairing is a hands-free experience. In addition, the personal code can be chosen to be user in embodiments of the invention, and embodiments of the invention are user friendly.

The connection protocol described above can be used in a number of different systems including payment transaction processing systems, and secure location access systems (e.g., hotels with secure doors to rooms). Examples of such systems are shown in FIGS. 5 and 6.

Figure 5:
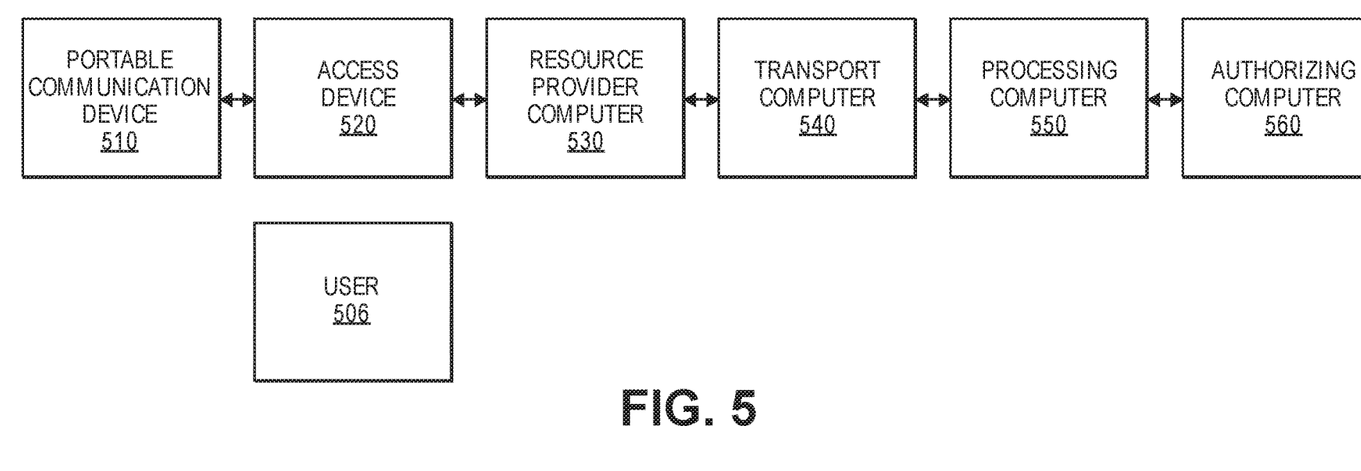
FIG. 5 shows a block diagram of a transaction processing system according to an embodiment of the invention.
Figure 6:
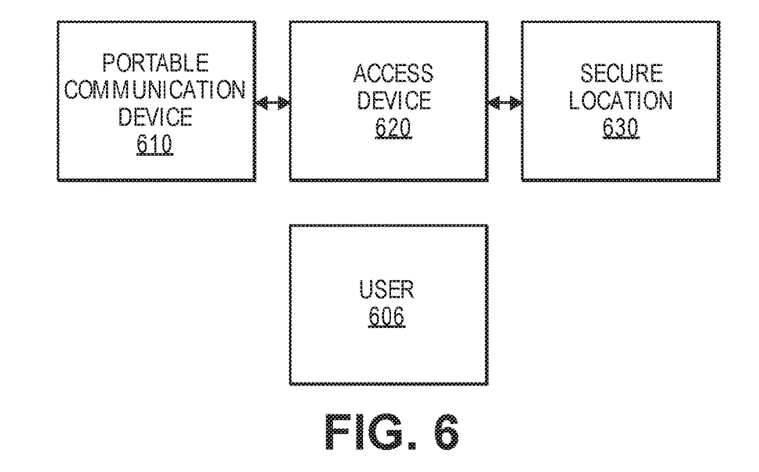
FIG. 6 shows a block diagram of a secure location access system according to an embodiment of the invention.

FIG. 5 shows a block diagram of a transaction processing system that can use a portable communication device with access data (e.g., access tokens). FIG. 5 shows a user 506 that can operate a portable communication device 510. The user 506 may use the portable communication device 510 to pay for a good or service at a merchant. The merchant may operate a resource provider computer 230 and/or an access device 220. The merchant may communicate with an authorizing computer 560 (e.g., an issuer computer) via a transport computer 540 (e.g., an acquirer computer) and a processing computer 550 (e.g., a computer in a payment processing network).

A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a portable communication device 510 at an access device 520 (e.g. a POS terminal) can be described as follows. A user 506 presents his or her portable communication device 510 to an access device 520 to pay for an item or service, after a secure communication channel is formed between the access device and the portable communication device 510, as described above. The portable communication device 510 and the access device 520 interact such that one or more access data (e.g., a PAN, a payment token, verification value(s), expiration date, etc.) from the portable communication device 510 are received by the access device 520 (e.g., via a contact or contactless interface). The resource provider computer 530 may then generate an authorization request message that includes the information received from the access device 520 (i.e. information corresponding to the portable communication device 510) along with additional transaction information (e.g., a transaction amount, merchant specific information, etc.) and electronically transmits this information to a transport computer 540 (e.g.; an acquirer computer). The transport computer 540 may then receive, process, and forward the authorization request message to an authorizing computer 560 (e.g., an issuer computer) via the processing computer 550 (e.g., a computer in a payment processing network) for authorization. The authorizing computer 560 may reply with an authorization response message. The authorization response message may be transmitted from the authorizing computer 560 to the access device 520 via the resource provider computer 530, the transport computer 540, and the processing computer 550.

At a later time, a clearing and settlement process can occur between the transport computer 450, processing computer 550, and the authorizing computer 560.

FIG. 6 shows a block diagram of a secure location access system. FIG. 6 shows a portable communication device 610 operated by a user 606. The portable communication device 610 has been provisioned with access data as described above. The portable communication device 610 can interact with the access device 620 and pass or transmit access data to the access device 620, after a secure communication channel is formed between the portable communication device 610 and the access device 620, as described above. The access device 620 may locally verify the received access data or it may communicate with a remotely located authentication server computer (not shown). The remotely located authentication server computer may verify that the access data are authentic and may transmit a signal indicating this back to the access device 620, The access device 620 may then proceed to let the user 606 enter the secure location 630.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other access requests may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
generating, by a portable communication device comprising a data processor and a memory storing a personal token, a first random code, the portable communication device being used by a user;
transmitting, by the portable communication device, the first random code to an access device within a vicinity of the portable communication device, wherein the access device receives the first random code, generates a second random code, receives the personal token from the user of the portable communication device, and hashes the first random code, the second random code, and the personal token to form a first hash output;
receiving, from the access device, the first hash output and the second random code;
hashing the first random code, the stored personal token, and the second random code to form a second hash output;
determining, by the portable communication device, if the first hash output and the second hash output are equal; and
forming a secure communication channel between the portable communication device and the access device when the first hash output and the second hash output are equal.

2. The method of claim 1, wherein the data processor is a first data processor and the memory is a first memory, and wherein the access device comprises input elements, a second data processor, and a second memory, wherein the user enters the personal token into the access device via the input elements and the second memory is configured to store the personal token and subsequently delete the personal token.

3. The method of claim 1, wherein the secure communication channel is not formed between the access device and the portable communication device if the first hash output and the second hash output are not equal.

4. The method of claim 1, wherein the secure communication channel utilizes a short-range communication protocol.

5. The method of claim 1, wherein the portable communication device is a mobile phone.

6. The method of claim 1, wherein the method further comprises, after forming the secure communication channel:
transmitting access data from the portable communication device to the access device.

7. The method of claim 6, wherein the access data includes an access token.

8. The method of claim 1, wherein the portable communication device is a mobile phone and the access device is a point of sale terminal.

9. A portable communication device comprising:
a processor; and
a non-transitory computer readable medium coupled to the processor, comprising code executable by the processor for implementing a method comprising:
generating, by the portable communication device comprising a data processor and a memory storing a personal token, a first random code, the portable communication device being used by a user,
transmitting, by the portable communication device, the first random code to an access device in a vicinity of the portable communication device, wherein the access device receives the first random code, generates a second random code, receives the personal token from the user of the portable communication device, and hashes the first random code, the second random code, and the personal token to form a first hash output,
receiving, from the access device, the first hash output and the second random code, hashing the first random code, the stored personal token, and the second random code to form a second hash output, determining, by the portable communication device, if the first hash output and the second hash output are equal, and forming a secure communication channel between the portable communication device and the access device when the first hash output and the second hash output are equal.

10. The portable communication device of claim 9, wherein the secure communication channel is a secure wireless communication channel.

11. The portable communication device of claim 10, wherein the secure wireless communication channel utilizes a medium range communication protocol.

12. The portable communication device of claim 9, wherein the portable communication device is a mobile phone.

13. The portable communication device of claim 9, wherein the method further comprises, after forming the secure communication channel:
  transmitting access data from the portable communication device to the access device.

14. The portable communication device of claim 13, wherein the access data is an access token, wherein the access token is a payment token.

15. A method comprising:
  receiving, by an access device, a personal token from a user;
  receiving, by the access device, a first random code from a portable communication device;
  generating, by the access device, a second random code;
  generating, by the access device, a first hash output of the first random code, the second random code, and the personal token;
  transmitting, by the access device, the second random code and the first hash output to the portable communication device within a vicinity of the access device, wherein the portable communication device generates a second hash output by hashing the personal token, the first random code, and the second random code, and determines if the first hash output and the second hash output are equal; and
  forming a secure communication channel between the access device and the portable communication device when the first hash output and the second hash output are the same.

16. The method of claim 15, wherein the portable communication device is a mobile phone.

17. The method of claim 15, wherein the method further comprises, after forming the secure communication channel:
  receiving, from the portable communication device, access data;
  generating, an authorization request message including the access data; and
  transmitting the authorization request message to an authorizing computer.

18. The method of claim 15, wherein the access device allows or does not allow access to a secure location.

19. The method of claim 15, further comprising:
  transmitting, by the access device, at least the second random code to a plurality of additional portable communication devices that do not store the personal token, and that do not form a secure communication channel with the access device.

20. The method of claim 15, wherein the portable communication device is a mobile phone and the access device is a point of sale terminal.

* * * * *